United States Patent
Aradachi et al.

(10) Patent No.: US 7,652,450 B2
(45) Date of Patent: Jan. 26, 2010

(54) SECONDARY BATTERY CHARGING DEVICE

(75) Inventors: Takao Aradachi, Hitachinaka (JP);
Shinji Watanabe, Hitachinaka (JP);
Kazuhiko Funabashi, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 371 days.

(21) Appl. No.: 11/519,874

(22) Filed: Sep. 13, 2006

(65) Prior Publication Data

US 2007/0075685 A1 Apr. 5, 2007

(30) Foreign Application Priority Data

Sep. 13, 2005 (JP) ............................. P2005-265042

(51) Int. Cl.
*H02J 7/00* (2006.01)
(52) U.S. Cl. .................. 320/106; 320/110; 320/120; 320/125; 320/138; 320/166
(58) Field of Classification Search ................. 320/106, 320/120, 166, 110, 125, 138
See application file for complete search history.

(56) References Cited

U.S. PATENT DOCUMENTS

2004/0108834 A1 * 6/2004 Takano et al. ............... 320/120

FOREIGN PATENT DOCUMENTS

| CN | 1505236 A | 6/2004 |
| CN | 2640097 Y | 9/2004 |
| JP | 2004-187366 | 7/2004 |

* cited by examiner

*Primary Examiner*—Edward Tso
*Assistant Examiner*—Yalkew Fantu
(74) *Attorney, Agent, or Firm*—Antonelli, Terry, Stout & Kraus, LLP.

(57) ABSTRACT

In a charging device, a driving power supply circuit for driving a control circuit is formed as a separate system from a first power supply circuit, regardless of whether the first power supply circuit is in a driving state or a non-driving state. A microcomputer alternately and intermittently controls the first power supply circuit in the driving state or the non-driving state when the battery pack is not mounted in the charging device in order to reduce the potential difference between the battery pack and the output voltage of the first power supply circuit, thereby avoiding an excessive discharge current from the battery pack when the battery pack is mounted in the charging device.

24 Claims, 4 Drawing Sheets

SECONDARY BATTERY CHARGING DEVICE

BACKGROUND OF THE INVENTION

1. Field of the Invention

The present invention relates to a charging device for charging secondary batteries, and particularly to a charging device for suppressing an excessive discharge current from a battery pack having lithium batteries or the like (including lithium ion batteries) when the battery pack is initially mounted in the charging device.

2. Description of the Related Art

With the development of portable devices such as cordless power tools, high-capacity secondary batteries, including nickel hydrogen batteries and nickel cadmium batteries, are increasingly being used as the power source for such portable devices. Another type of high-capacity secondary battery that is being used more and more in portable devices is the lithium battery, which produces a higher voltage than the nickel hydrogen or nickel cadmium batteries.

The lithium battery has a nominal voltage about 2-3 times greater than the more widely used nickel hydrogen and nickel cadmium batteries. The lithium battery also has an energy density about three times that of nickel cadmium batteries, while remaining compact and lightweight. Moreover, lithium batteries can discharge in a relatively low-temperature environment, thereby obtaining a stable voltage within a broader temperature range.

Obviously, the greater the voltage required for a cordless power tool or the like, the greater the number of battery cells that must be accommodated in the battery pack of the secondary battery. For example, since the nominal voltage of a nickel hydrogen battery cell is 1.2 V, twelve such battery cells are required in power tools operating on a battery voltage of 14.4 V and twenty cells must be included in a battery pack for a power tool operating at 24 V. However, since lithium batteries have a higher nominal voltage of 3.6 V, only four such battery cells are required in a battery pack to produce 14.4 V.

Battery packs having different voltages are provided to meet the voltage requirements of various portable devices. As a result, universal charging devices capable of charging battery packs with differing numbers of battery cells have become commonplace. One such universal charger is disclosed in Japanese patent application publication No. 2004-187366. Further, while battery packs for lithium batteries require a charging method using constant current and constant voltage control, as shown in FIG. 5, battery packs with nickel hydrogen cells or nickel cadmium cells require a charging method using constant current control, such as that shown in FIG. 6. Accordingly, there is an increasing number of universal charging devices capable of charging various types of battery packs having different battery voltages and requiring different charge control.

In order to perform constant current control when charging a battery pack having nickel hydrogen and nickel cadmium batteries, the universal charging device described above must set the output voltage to a value corresponding to the battery pack having the largest number of battery cells that can be charged with the charging device.

In the charging device disclosed in Japanese patent application publication No. 2004-187366, a relay switch for turning the path of the charging current on and off is provided between the charging source and the battery pack being charged. When the relay switch is closed in this charging device to begin charging and a low-voltage battery pack having few battery cells is mounted in the charging device, the charging device will apply a high-output voltage corresponding to a high-voltage battery pack with a large number of battery cells to this battery pack having few battery cells, causing an excessively large inrush current to flow as soon as the relay switch is closed. Consequently, the relay switch provided along the charging current path suffers great damage. Further, the relay switch is turned off when a battery pack is not mounted in the charging device or when the mounted battery pack is determined to be fully charged and charging is ended, thereby interrupting supply of the charging source. However, since the charging current is controlled to supply the highest output voltage required for a battery pack having the largest number of battery cells that can be charged by the charging device, power consumption is high, even when the relay switch is turned off.

To resolve the problem of an inrush current flowing from the charging source to the battery pack described above, Japanese patent application publication No. 2004-187366 proposes a charging device having an output voltage setting means capable of setting one of a plurality of output voltages. With this construction, the output voltage setting means sets the output voltage of the charging source to a first output voltage greater than the battery voltage required for the battery pack being charged when the relay switch is on for charging, and sets the output voltage to a second output voltage smaller than the first output voltage when the relay switch is off.

However, the charging device described above does not sufficiently reduce power consumption because the power supply circuit of the charging device continuously outputs a constant voltage during the standby state in which a battery pack is not mounted in the charging device or when the mounted battery pack is no longer being charged.

Further, the charging device disclosed in Japanese patent application publication No. 2004-187366 simultaneously uses the same power supply as the first power supply circuit for supplying power to charge the battery pack and as the second power supply of a control circuit in a microcomputer and the like. Therefore, halting the supply of power from the first power supply circuit also halts the supply of power for the control circuit. Since it is necessary to always output a charge voltage, this charging device cannot sufficiently reduce power consumption.

By providing a separate power supply from the first power supply circuit as the second power supply for the control circuit of the microcomputer and the like, it is possible to halt output from the first power supply circuit when not charging a battery pack and to eliminate the need for a relay switch isolating output of the first power supply circuit from the battery pack, thereby preventing the problem of a large inrush current described above. However, simply interrupting output does not prevent a large discharge current from momentarily flowing from the batter pack to the smoothing capacitor in the first power supply circuit the instant the battery pack is mounted in the charging device. Since a large charging/discharging current can reduce the life of a lithium battery and otherwise reduce the battery's performance, it is necessary to consider adding a special circuit for preventing such excessive discharge.

SUMMARY OF THE INVENTION

In view of the foregoing, it is an object of the present invention to provide a charging device capable of reducing power during a standby state and capable of suppressing or preventing an excessive discharge current from being produced when a battery pack is mounted in the charging device.

It is another object of the present invention to provide a charging device suitable for charging a battery pack having lithium battery cells.

The above and other objects will be attained by a charging device that includes: a first power supply circuit that generates an output voltage and supplies a charging power to the battery pack; an output voltage control circuit that controls the output voltage of the first power supply circuit; a charging current control circuit that controls a charging current supplied from the first power supply circuit to the battery pack a control unit that selectively controls the first power supply circuit in a driving state or a non-driving state; and a second power supply circuit that supplies power to the output voltage control circuit, the charging current control circuit, and the control unit. The control unit, such as a microcomputer, alternately controls the first power supply circuit in the driving state or the non-driving state when the battery pack is not connected.

The second power supply circuit may form a separate system from the first power supply circuit regardless of whether the first power supply circuit is in the driving state or the non-driving state.

It is preferable that the battery pack is directly connectable to an output side of the first power supply circuit.

The battery pack applicable to the charging device is the one that includes lithium type batteries.

The first power supply circuit may include a charge/discharge circuit that produces the output voltage. With this configuration, the charge/discharge circuit is in a chargeable condition when the first power supply circuit is in the driving state whereas the charge/discharge circuit is in a dischargeable condition when the first power supply circuit is in the non-driving state. Preferably, the charge/discharge circuit includes a capacitor and a resistor, wherein a voltage developed across the capacitor is indicative of the output voltage of the first power supply circuit.

The charging device may further include a battery voltage detecting circuit that detects a voltage across the battery pack and is operatively connected to the control unit. In addition to the battery voltage detecting circuit, the charging device may further include a battery temperature detecting circuit that detects a temperature of the battery pack and is operatively connected to the control unit. With this configuration, the control unit determines whether the battery pack is connected or the battery pack is not connected based on at least one of outputs from the battery voltage detecting circuit and the battery temperature detecting circuit. When the control unit determines that the battery pack is not connected, the control unit alternately produces a first control signal and a second control signal wherein the first control signal is produced for a first duration of time during which time the first power supply circuit is placed in the driving state, and the second control signal is produced for a second duration of time during which time the first power supply circuit is placed in the non-driving state. The first power supply circuit may include a charge/discharge circuit that produces the output voltage applied to the battery pack. The charge/discharge circuit is in a chargeable condition when the first control signal is produced from the control unit whereas the charge/discharge circuit is in a dischargeable condition when the second control signal is produced from the control unit. The first duration of time and the second duration of time are set depending on a discharge time of the capacitor determined by a time constant of the capacitor and the resistor. It is preferable that the first duration of time be set longer than the second duration of time.

When the control unit determines that the battery pack is connected, the control unit continuously produces a first control signal, causing the first power supply circuit to place in the driving condition.

In the charging device according to one aspect of the invention, the second power supply circuit forms a separate system from the first power supply circuit, regardless of whether the first power supply circuit is in the driving state or the non-driving state, and the control unit alternately controls the first power supply circuit in the driving state or the non-driving state when a battery pack is not connected, thereby reducing power consumption.

Further, the first power supply circuit has a capacitor that is charged through intermittent operations of the first power supply circuit when the battery pack is not connected. Accordingly, when the battery pack is connected, the potential difference between the battery pack and the output voltage of the first power supply circuit is small, thereby suppressing an excessive discharge current from the battery pack.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE PREFERRED EMBODIMENTS

A battery charger 200 according to a preferred embodiment of the invention will be described with reference to FIGS. 1 through 4.

Figure 1:
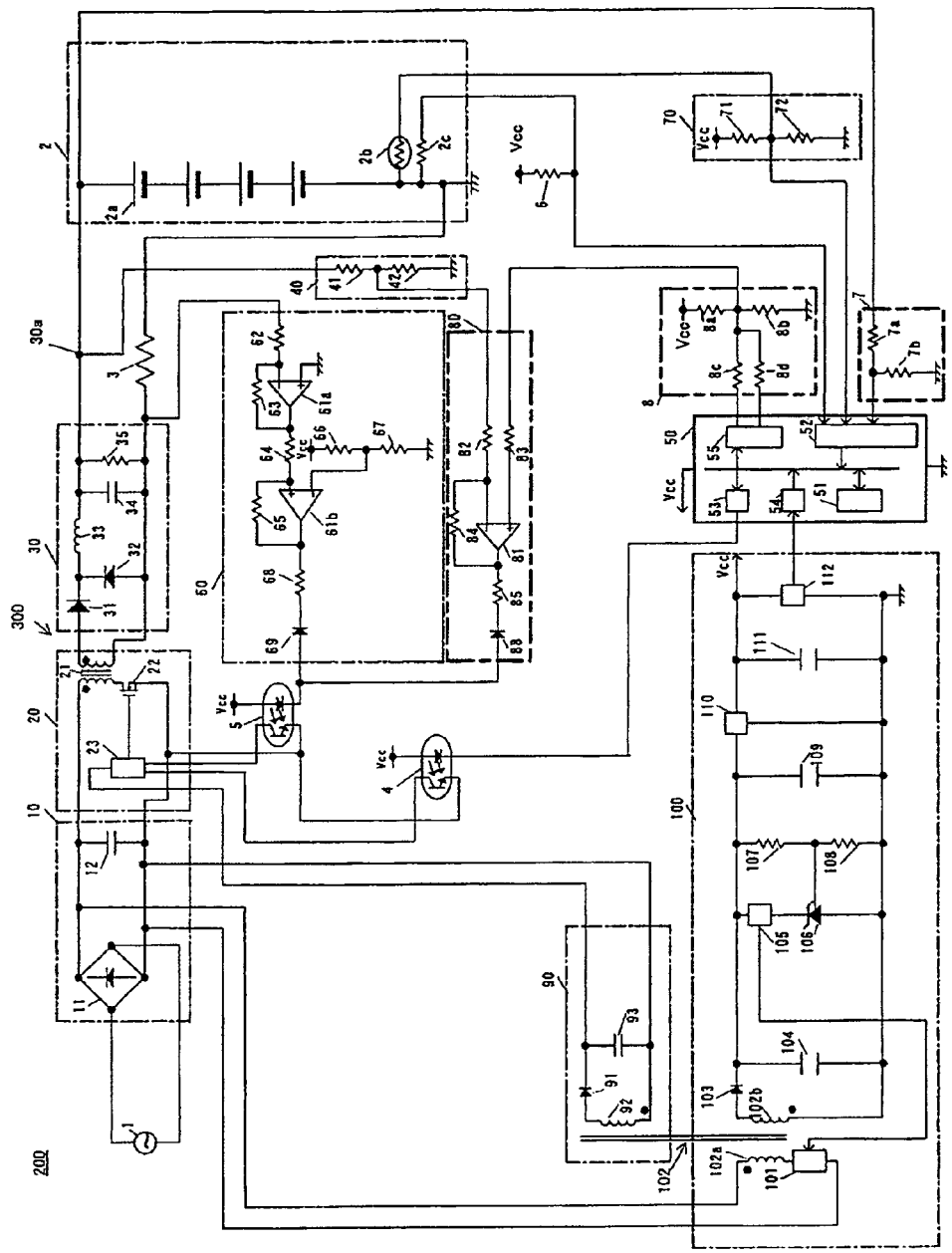
FIG. 1 is a circuit diagram of a charging device according to a preferred embodiment of the present invention.

FIG. 1 is a circuit diagram showing a battery charger. 200 in accordance with the embodiment of the invention. In use, the battery charger 200 is connected to an AC power supply 1 and a battery pack 2 is mounted in the battery charger 200. As shown in FIG. 1, a pair of connection terminals is provided for connection of the battery pack 2 thereacross. The battery pack 2 includes one or more rechargeable battery cells connected in series. In the embodiment shown in FIG. 1, four lithium battery cells 2a are connected in series. In place of the lithium battery cells 2a, a nickel-cadmium battery or nickel-metal hydride battery can be used. The battery pack 2 further includes a thermistor 2b serving as a temperature sensing element. The thermistor 2b is disposed in contact with or in proximity with a preselected cell in the battery pack 2 in order to generally sense the temperature of the battery pack 2. The battery pack 2 further includes a cell number determining element 2c for determining the number of cells accommodated in the battery pack 2. The cell number determining resistor 2c is formed with an element having a resistance value determined depending upon the number of cells.

The battery charger 200 includes a first power supply circuit 300 for supplying charging power to the battery pack 2. The first power supply circuit 300 is configured from a first rectifying/smoothing circuit 10, a switching circuit 20, and a second rectifying/smoothing circuit 30. The first rectifying/smoothing circuit 10 is connected, in use, to the AC power supply 1 and includes a full-wave rectifier 11 and a smoothing capacitor 12. The switching circuit 20 is connected to the output of the first rectifying/smoothing circuit 10 and includes a high-frequency transformer 21, a MOSFET 22 connected in series to the primary winding of the transformer 21, and a PWM control IC 23 for modulating the pulse width of driving pulses to be applied to the gate of the MOSFET 22.

The second rectifying/smoothing circuit 30 is connected to a secondary winding of the high-frequency transformer 21 and includes diodes 31, 32, a choke coil 33, a smoothing capacitor 34, and a discharge resistor 35. The first power supply circuit 300 has an output terminal 30a to which the battery pack 2 is directly connected without interposing a relay switch or other types of switches therebetween.

A charging current control circuit 60 and an output voltage control circuit 80 are connected to the first power supply circuit 300.

The charging current control circuit 60 includes operational amplifiers 61a and 61b, input resistors 62 and 64, feedback resistors 63 and 65, resistors 66 and 67 serving as a charging current setting means, diode 69, and a current limiting resistor 68. The resistors 66 and 67 are connected in series between the constant voltage Vcc supplied from a second power supply circuit 100 to be described later and ground. The voltage developed across the resistor 67 represents a voltage corresponding to the charging current to be set and is applied to the inverting input terminal of the operational amplifier 61b. The charging current control circuit 60 has an input side to which a charging current detecting resistor 3 is connected. The resistor 3 is also connected to the negative terminal of the battery pack 2 and detects a charging current flowing in the battery pack 2.

The charging current detected by the charging current detecting resistor 3 is applied to the operational amplifier 61a by which the voltage corresponding to the charging current is subject to inverting amplification. The operational amplifier 61b amplifies the difference between the output voltage of the operational amplifier 61a and the reference voltage developed across the resistor 67 and feeds this difference back to the PWM control IC 23 via a photocoupler 5. With the circuit configuration of the charging current control circuit 60 as described above, the charging current to be supplied to the batter pack 2 is controlled by the output signal from the charging current control circuit 60.

The output voltage control circuit 80 is configured from an operational amplifier 81, input resistors 82 and 83, feedback resistor 84, diode 88 and current limiting resistor 85. A battery voltage detecting circuit 7 is provided for detecting a voltage across the terminals of the battery pack 2. The battery voltage detecting circuit 7 has an input side to which an output voltage detecting circuit 40 is connected. The output voltage detecting circuit 40 is provided for detecting the output voltage from the first power supply circuit 300 and configured from resistors 41 and 42 connected in series across the positive and negative terminals of the first power supply circuit 300. The voltage developed across the resistor 42 represents the voltage currently produced by the first power supply circuit 300 and is applied to the output voltage control circuit 80 as a feedback voltage. The operational amplifier 81 amplifies the difference between the voltage from the output voltage detecting circuit 40 and a voltage from an output voltage setting circuit 8 to be described later and feeds this difference back to the PWM control IC 23 via the photocoupler 5, whereby the output voltage of the first power supply circuit 300 is controlled by the output of the output voltage control circuit 80.

The output voltage setting circuit 8 is configured from resistors 8a, 8b, 8c and 8d wherein the resistors 8a and 8b are connected in series between the constant voltage Vcc and ground. Each of the resistors 8c and 8d is connected at one side to the connection node between the resistors 8a and 8b and at the other side to the output port 55 of a microcomputer 50 to be described later. In this embodiment, when both the first and second output ports of the microcomputer 50, to which the resistors 8c and 8d are connected respectively, are at a high impedance, the output voltage setting circuit 8 outputs 21V which voltage corresponds to five cells. When the first output port of the microcomputer 50 is low and the second output port is high, the output voltage setting circuit 8 outputs 16.8V which voltage corresponds to four cells. On the other hand, when the first output port of the microcomputer 50 is high and the second output port is low, the output voltage setting circuit 8 outputs 12.6V which voltage corresponds to three cells. The output voltage from the output voltage setting circuit 8 is applied through the input resistor 83 to the non-inverting input terminal of the operational amplifier 81 of the output voltage control circuit 80.

The PWM control IC 23 performs on/off control of the MOSFET 22 in response to control signals fed via the photocouplers 4 and 5. By varying the pulse width of the driving pulses applied to the gate of the MOSFET 22, the ON duration of the MOSFET 22 can be controlled, so that the output voltage of the second rectifying/smoothing circuit 30 and also the charging current supplied to the battery pack 2 can be controlled.

The first power supply circuit 300, charge current control circuit 60, output voltage control circuit 80, and battery temperature detecting circuit 70 are controlled by the microcomputer 50. The microcomputer 50 includes a CPU 51 for executing control programs, A/D converter 52, output ports 53 and a reset input port 54 in addition to the previously described output port 55. The A/D converter 52 has input terminals for receiving analog signals from the cell number determining resistor 2c, the battery voltage detecting circuit 7 to be described later, and the battery temperature detecting circuit 70. The A/D converter 52 converts each of these analog signals to a digital signal. The output port 53 outputs a control signal for controlling the photocoupler 4. The reset input port 54 receives a reset signal from a second power supply circuit 100 to be described later when initially powered by the application of the voltage Vcc to the microcomputer 50.

Although not shown in FIG. 1, the microcomputer 50 further includes a ROM storing therein various pieces of data including the control programs to be executed by the CPU 51 and data regarding the battery pack 2, RAM for temporarily storing data, and a timer.

The battery temperature detecting circuit 70 is configured from resistors 71 and 72 connected in series between the constant voltage Vcc and ground. The connection node of the resistors 71 and 72 is connected to the thermistor 2b and also to the A/D converter 52 of the microcomputer 50 so that the voltage developed across the resistor 72 is applied to the microcomputer 50. The voltage developed across the resistor 72 changes depending on the resistance of the thermistor 2b and is thus indicative of the temperature of the battery pack 2.

As previously described, the cell number determining resistor 2c has a resistance value depending on the number of cells accommodated in the battery pack 2. The cell number determining resistor 2c forms a cell number determining circuit together with a voltage division resistor 6 having one terminal connected to the cell number determining resistor 2b and another terminal to the constant voltage Vcc. The voltage developed across the cell number determining resistor 2b is applied to the A/D converter 52, whereupon the microcomputer 50 determines the number of cells 2a accommodated in the battery pack 2.

The battery charger 200 further includes the battery voltage detecting circuit 7 configured from resistors 7a and 7b connected in series between the positive terminal of the battery pack 2 and ground. The voltage developed across the resistor 7b, which corresponds to the voltage across the battery pack 2, is applied to the A/D converter 52 of the microcomputer 50.

Control signals for commencing or halting the charge of the battery pack 2 are generated upon execution of the control programs and supplied from the output port 53 of the microcomputer 50 to the PWM control IC 23 via the photocoupler 4. When the PWM control IC 23 has received the control signal to commence the charge of the battery pack 2, the MOSFET 2 is turned on whereas when the PWM control IC has received the control signal to halt the charge of the battery pack 2, the MOSFET 2 is turned off.

The battery charger 200 further includes a second power supply circuit 100. The second power supply circuit 100 includes a power source transformer 102 with a primary winding 102a and a secondary winding 102b; a switching device 101 connected in series to the primary winding 102a; a rectifying diode 103 connected to the positive line of the secondary winding 102b; a smoothing capacitors 104 connected across the positive and negative lines of the secondary winding 102b; resistors 107 and 108 connected in series between the positive and negative lines of the secondary winding 102b; a shunt regulator 106; a feedback unit (photocoupler) 105; and a smoothing capacitor 109 connected between the positive and negative lines of the secondary winding 102b.

The second power supply circuit 100 further includes a 3-terminal regulator 110, and a smoothing capacitor 110. The 3-terminal regulator 110 has an input terminal connected to the positive line of the secondary winding 102b, an output terminal from which the constant voltage Vcc is produced, and a ground terminal connected to the negative line of the secondary winding 102b of the transformer 102.

The second power supply circuit 100 also includes a reset IC 112. The reset IC 112 is connected between the output terminal of the 3-terminal regulator 110 and the negative lines of the secondary winding 102b and is also connected to the reset input port 54 of the microcomputer 50. The reset IC 112 outputs a reset signal to the reset input port 54 in order to reset the microcomputer 50 to an initialized state.

The battery charger 200 further includes a third power supply circuit 90 for powering the PWM control IC 23. The PWM control IC 23 is enabled when powered by the third power supply circuit 90 and is disabled when unpowered by the third power supply circuit 90. The third power supply circuit 90 includes a tertiary winding 92 magnetically coupled to the primary winding 102a of the second power supply circuit 100, a diode 91 connected to the positive line of the tertiary winding 92, and a capacitor 93 connected across the positive and negative lines of the tertiary winding 92. The second power supply circuit 100 is formed as a separate system from the first power supply circuit 300 regardless of whether the first power supply circuit 300 is in a driving state or a non-driving state.

Figure 3:
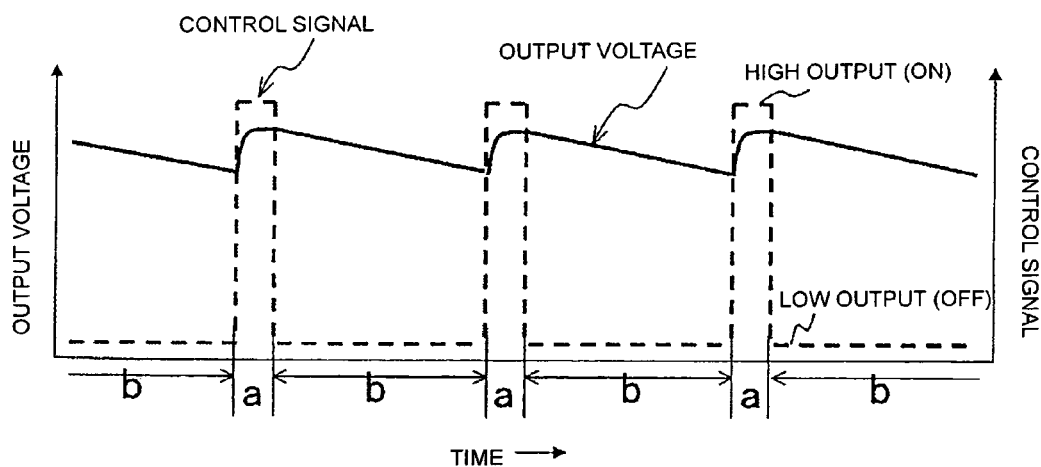
FIG. 3 is a waveform diagram illustrating an intermittent output voltage in the charging device of FIG. 1.

In accordance with the embodiment of the invention, when the battery pack 2 is not mounted in the battery charger 200, the microcomputer 50 supplies a control signal to the PWM control IC 23 via the photocoupler 4 so that the first power supply circuit 300 is alternately and intermittently placed in the driving state in the interval "a" or the non-driving state in the interval "b" as shown in FIG. 3.

In further accordance with the embodiment of the invention, the constant voltage Vcc applied to the microcomputer 50, charging current control circuit 60, output voltage control circuit 80, battery temperature detecting circuit 70, voltage division resistor 6 of the cell number determining circuit, and the like is generated by the second power supply circuit 100 branched from the first rectifying/smoothing circuit 10 of the first power supply circuit 300. The second power supply circuit 100 is formed as a separate system from the first power supply circuit 300 and is operative regardless of whether the first power supply circuit 300 is in a driving state or a non-driving state.

Figure 2:
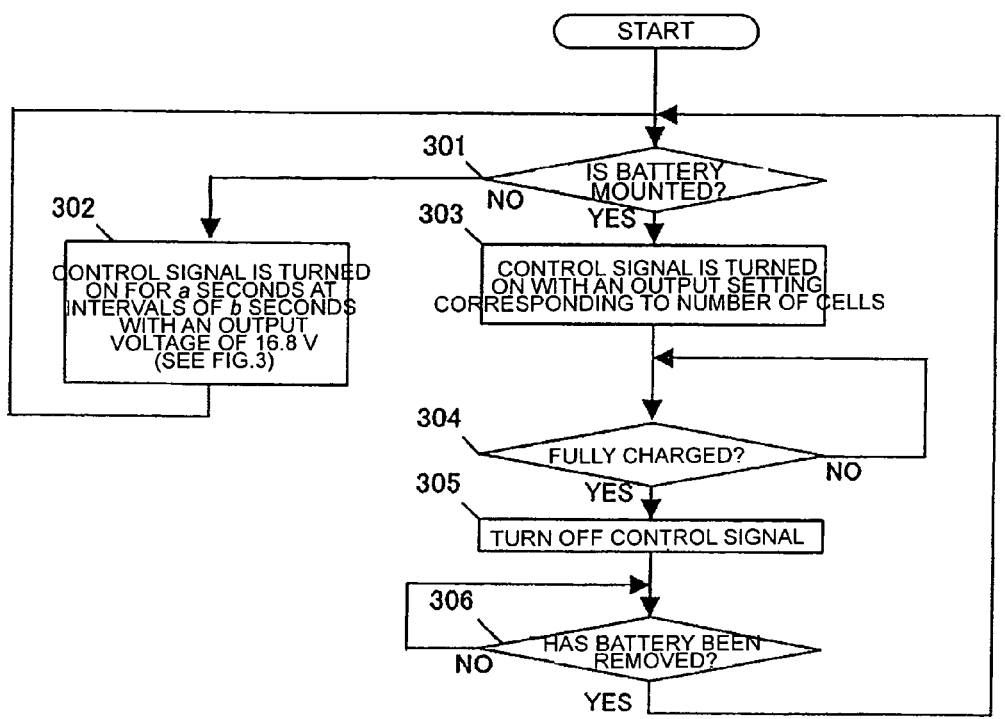
FIG. 2 is a flowchart illustrating steps in a charge controlling method employed in the charging device of FIG. 1.

Next, operations of the charging device 200 according to the embodiment will be described while referring to the circuit diagram in FIG. 1 and the flowchart in FIG. 2.

When power to the charging device 200 is turned on, the microcomputer 50 enters a standby state to wait for a battery pack 2 to be connected. In S301 of FIG. 2, the charging device 200 determines whether the battery pack 2 has been mounted (connected) based on at least one of detection signals from the battery voltage detecting circuit 7 and the battery temperature detecting circuit 70.

If a battery pack 2 has not been mounted in S301 (S301: NO), then in S302 the microcomputer 50 outputs a HIGH control signal from the output port 53 for an interval "a", such as 500 ms, and subsequently outputs a LOW control signal for an interval "b", such as 5 seconds, as shown in FIG. 3. In other words, every "b" seconds, the first power supply circuit 300 outputs a HIGH signal for an interval "a". Based on this control signal, the PWM control IC 23 is controlled to intermittently drive the first power supply circuit 300, and particularly the switching circuit 20 via the photocoupler 4. Specifically, the first power supply circuit 300 is set to a driving state (operating state) via the photocoupler 4 when a HIGH control signal is outputted for the interval "a", thereby charging the smoothing capacitor 34 of the second rectifying/smoothing circuit 30. When a LOW control signal is outputted for "b" seconds, the first power supply circuit 300 is set to a non-driving state (non-operating state), allowing the smoothing capacitor 34 to discharge during this interval. The output voltage of the first power supply circuit 300, and specifically the voltage of the smoothing capacitor 34, is controlled by repeatedly performing this charging/discharging operation. In the preferred embodiment, the output voltage is set to 16.8 V. The ratio of the interval "a" during which the first power supply circuit 300 is in the driving state to the interval "b" in which the first power supply circuit 300 is in the non-driving state is controlled so that the control signal turns on before the charge of the smoothing capacitor 34 in the non-driving state is discharged by the discharge resistor 35. However, the interval "b" for the non-driving state must be set to an appropriate value that is not too small, or else the power consumption of the first power supply circuit 300 will increase. The interval "a" of the driving state and the interval "b" of the non-driving state are set with consideration for the discharge time of the smoothing capacitor 34 determined by a time constant of the smoothing capacitor 34 and discharge resistor 35.

Figure 4:
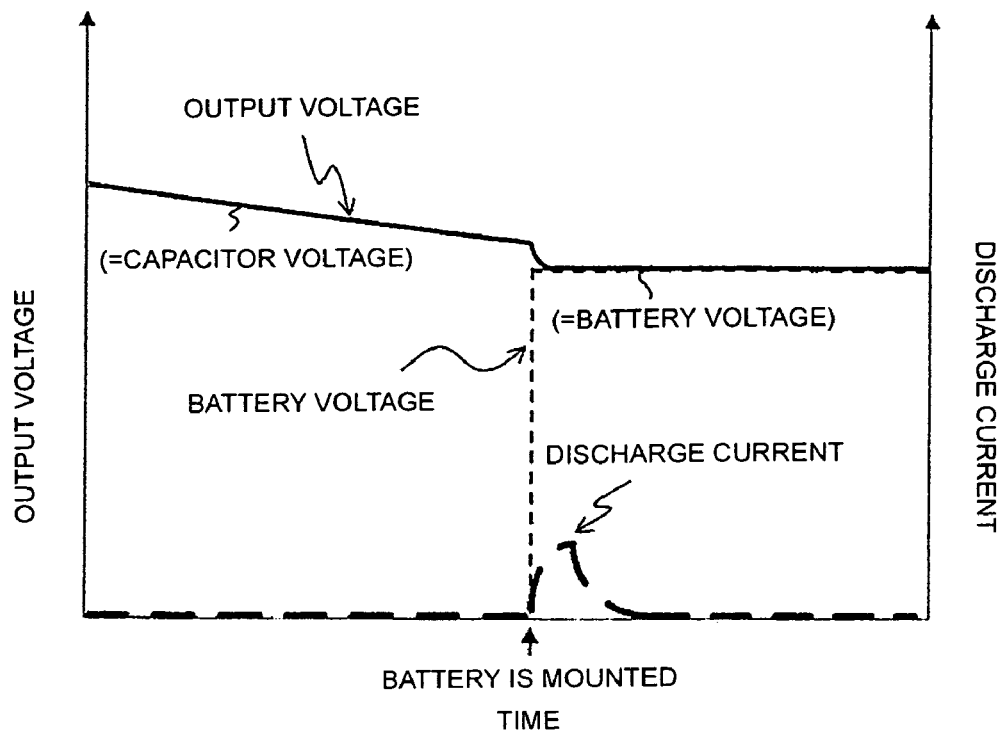
FIG. 4 is a waveform diagram illustrating the discharge waveform generated when a battery is mounted in the charging device of FIG. 1.

However, when the battery pack 2 is mounted in the charging device 200 (S301: YES), then in S303 the charging device 200 sets an output voltage corresponding to the number of battery cells in the battery pack 2 and outputs a HIGH control signal from the output port 53. As a result, the first power supply circuit 300 is set continuously in the driving state and begins charging the battery pack 2. In accordance with the embodiment of the invention, the output voltage is set to 16.8 V when the battery pack 2 is not mounted in the charging device 200 for intermittently driving the switching circuit 20. As shown in FIG. 4, this method can reduce the potential difference between the battery voltage and output voltage when the battery pack 2 is mounted in the charging device 200 from the differential generated when no output voltage (an output voltage of 0 V) is outputted when the battery pack 2 is not mounted on the charging device 200. Hence, the charging device 200 in accordance with the embodiment of the invention can suppress the discharge current from the battery pack 2 to a small value.

Figure 5:
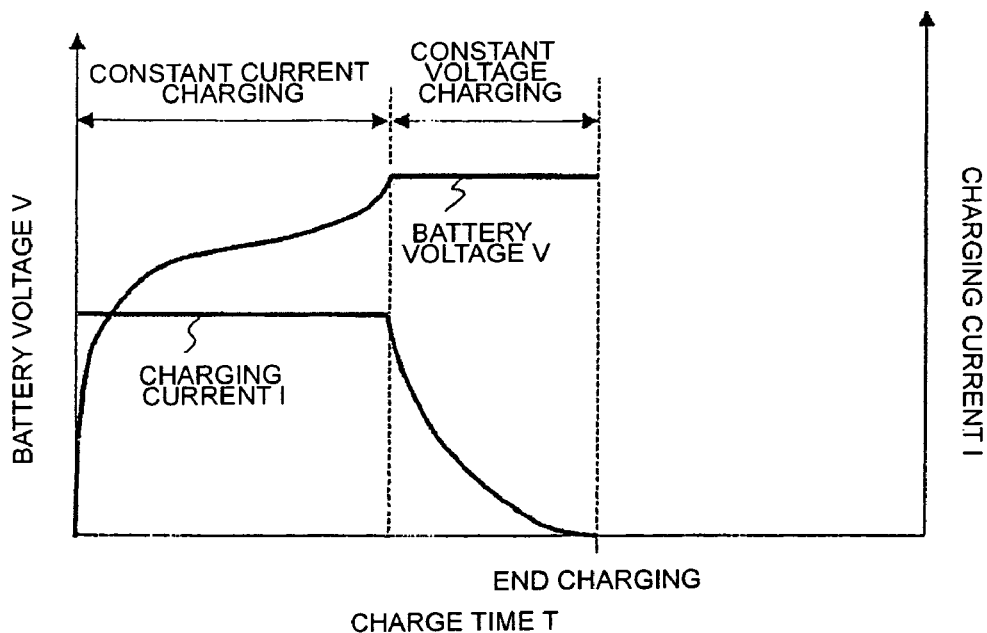
FIG. 5 is a graph showing charging characteristics of a charging device during constant current and constant voltage control.
Figure 6:
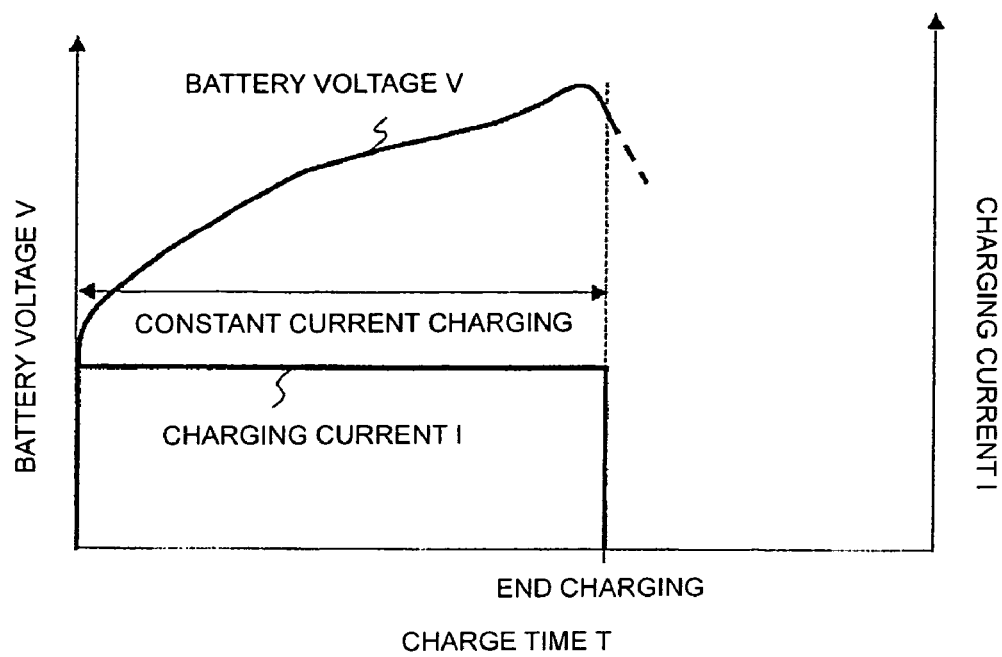
FIG. 6 is a graph showing charging characteristics of a charging device during constant current control.

In S304 the charging device 200 determines whether the battery pack 2 is fully charged. When charging a battery according to constant current and constant voltage control, as with lithium batteries, the charging device 200 determines whether the battery is fully charged by detecting whether the charging current during intervals of constant voltage control are no greater than a prescribed value, as shown in FIG. 5.

If the charging device 200 determines that the battery pack 2 is fully charged (S304: YES), then in S305 the microcomputer 50 outputs a LOW control signal, that is, a charge halting signal from the output port 53 to the PWM control IC 23 via the photocoupler 4. Consequently, the first power supply circuit 300 is set to the non-driving state, turning off the output voltage.

In S306 the charging device 200 determines whether the charged battery pack 2 has been removed from the charging device 200. After the battery pack 2 has been removed (S306: YES), the charging device 200 returns to S301 and waits for the next battery pack 2 to be mounted.

As should be apparent from the above description, the present invention provides a charging device capable of reducing power output when the charging device is in a standby state and capable of preventing an excessive discharge current that can occur when a battery pack is first mounted in the charging device.

While the invention has been described in detail with reference to specific embodiments thereof, it would be apparent to those skilled in the art that many modifications and variations may be made therein without departing from the spirit of the invention, the scope of which is defined by the attached claims.

What is claimed is:

1. A charging device comprising:
a first power supply circuit that generates an output voltage and supplies a charging power to a battery pack
an output voltage control circuit that controls the output voltage of the first power supply circuit;
a charging current control circuit that controls a charging current supplied from the first power supply circuit to the battery pack;
a control unit that selectively controls the first power supply circuit in both a driving state and a non-driving state; and
a second power supply circuit that supplies power to the output voltage control circuit, the charging current control circuit, and the control unit,
wherein the control unit controls the first power supply circuit to operate alternately in the driving state and the non-driving state when the battery pack is not connected.

2. The charging device according to claim 1, wherein the second power supply circuit forms a separate system from the first power supply circuit regardless of whether the first power supply circuit is in the driving state or the non-driving state.

3. The charging device according to claim 1, wherein the battery pack is directly connectable to an output side of the first power supply circuit.

4. The charging device according to claim 1, wherein the battery pack includes lithium type batteries.

5. The charging device according to claim 1, wherein the first power supply circuit comprises a charge/discharge circuit that produces the output voltage, wherein the charge/discharge circuit is in a chargeable condition when the first power supply circuit is in the driving state whereas the charge/discharge circuit is in a dischargeable condition when the first power supply circuit is in the non-driving state.

6. The charging device according to claim 5, wherein the charge/discharge circuit comprises a capacitor and a resistor, wherein a voltage developed across the capacitor is indicative of the output voltage of the first power supply circuit.

7. The charging device according to claim 1, further comprising a battery voltage detecting circuit that detects a voltage across the battery pack, the battery voltage detecting circuit being operatively connected to the microcomputer.

8. The charging device according to claim 7, further comprising a battery temperature detecting circuit that detects a temperature of the battery pack, the battery temperature detecting circuit being operatively connected to the control unit.

9. The charging device according to claim 8, wherein the control unit determines whether the battery pack is connected or the battery pack is not connected based on at least one of outputs from the battery voltage detecting circuit and the battery temperature detecting circuit.

10. The charging device according to claim 9, wherein when the control unit determines that the battery pack is not connected, the control unit alternately produces a first control signal and a second control signal wherein the first control signal is produced for a first duration of time during which time the first power supply circuit is placed in the driving state, and the second control signal is produced for a second duration of time during which time the first power supply circuit is placed in the non-driving state.

11. The charging device according to claim 10, wherein the first power supply circuit comprises a charge/discharge circuit that produces the output voltage applied to the battery pack, wherein the charge/discharge circuit is in a chargeable condition when the first control signal is produced from the control unit whereas the charge/discharge circuit is in a dischargeable condition when the second control signal is produced from the control unit.

12. The charging device according to claim 11, wherein the first duration of time and the second duration of time are set depending on a discharge time of the capacitor determined by a time constant of the capacitor and the resistor.

13. The charging device according to claim 12, wherein the first duration of time is set longer than the second duration of time.

14. The charging device according to claim 9, wherein when the control unit determines that the battery pack is connected the control unit continuously produces a first control signal, causing the first power supply circuit to be placed in the driving condition.

15. The charging device according to claim 14, wherein the first power supply circuit comprises a charge/discharge circuit that produces the output voltage applied to the battery pack, wherein the charge/discharge circuit is placed in a chargeable condition in response to the first control signal.

16. A charging device comprising:
a first power supply circuit that generates an output voltage and supplies a charging power to a battery pack when the battery pack is connected to the first power supply circuit;
an output voltage control circuit that controls the output voltage of the first power supply circuit;
a charging current control circuit that controls a charging current supplied from the first power supply circuit to the battery pack;
a control unit that selectively controls the first power supply circuit in both a driving state and a non-driving state; and
a second power supply circuit that supplies power to the output voltage control circuit, the charging current control circuit, and the control unit,
wherein the control unit determines when the battery pack is not connected to the first power supply circuit and controls the first power supply circuit to operate alternately in the driving state and the non-driving state when the battery pack is not connected to thereby reduce a discharge current from the battery pack when it is connected to the first power supply circuit.

17. The charging device according to claim 16, wherein the second power supply circuit forms a separate system from the first power supply circuit regardless of whether the first power supply circuit is in the driving state or the non-driving state.

18. The charging device according to claim 16, wherein the first power supply circuit comprises a charge/discharge circuit that produces the output voltage, wherein the charge/discharge circuit is in a chargeable condition when the first power supply circuit is in the driving state whereas the charge/discharge circuit is in a dischargeable condition when the first power supply circuit is in the non-driving state.

19. The charging device according to claim 16, further comprising a battery voltage detecting circuit that detects a voltage across the battery pack, the battery voltage detecting circuit being operatively connected to the microcomputer.

20. The charging device according to claim 19, further comprising a battery temperature detecting circuit that detects a temperature of the battery pack, the battery temperature detecting circuit being operatively connected to the control unit.

21. The charging device according to claim 20, wherein the control unit determines whether the battery pack is connected or the battery pack is not connected based on at least one of outputs from the battery voltage detecting circuit and the battery temperature detecting circuit.

22. The charging device according to claim 21, wherein when the control unit determines that the battery pack is not connected, the control unit alternately produces a first control signal and a second control signal wherein the first control signal is produced for a first duration of time during which time the first power supply circuit is placed in the driving state, and the second control signal is produced for a second duration of time during which time the first power supply circuit is placed in the non-driving state.

23. The charging device according to claim 20, wherein when the control unit determines that the battery pack is connected the control unit continuously produces a first control signal, causing the first power supply circuit to be placed in the driving condition.

24. The charging device according to claim 16, wherein when the control unit determines that the battery pack is connected the control unit continuously produces a first control signal, causing the first power supply circuit to be placed in the driving condition.

* * * * *